United States Patent
Yang et al.

(10) Patent No.: US 9,650,022 B2
(45) Date of Patent: May 16, 2017

(54) BATTERY REPLACEMENT ROBOT WITH MOBILE STORAGE RACK AND BATTERY REPLACEMENT METHOD

(71) Applicant: SHANDONG LUNENG INTELLIGENCE TECHNOLOGY CO., LTD, Shandong (CN)

(72) Inventors: Yong Yang, Shandong (CN); Jinlong Zhao, Shandong (CN); Wenzheng Shang, Shandong (CN); Hui Qi, Shandong (CN); Lin Tan, Shandong (CN)

(73) Assignee: SHANDONG LUNENG INTELLIGENCE TECHNOLOGY CO., LTD, Shandong (CN)

( * ) Notice: Subject to any disclaimer, the term of this patent is extended or adjusted under 35 U.S.C. 154(b) by 143 days.

(21) Appl. No.: 14/409,995

(22) PCT Filed: May 22, 2013

(86) PCT No.: PCT/CN2013/076054
§ 371 (c)(1),
(2) Date: Dec. 19, 2014

(87) PCT Pub. No.: WO2014/000540
PCT Pub. Date: Jan. 3, 2014

(65) Prior Publication Data
US 2015/0151723 A1 Jun. 4, 2015

(30) Foreign Application Priority Data
Jun. 29, 2012 (CN) .......................... 2012 1 0223420

(51) Int. Cl.
*B65G 67/00* (2006.01)
*B60S 5/06* (2006.01)
*G05B 19/05* (2006.01)

(52) U.S. Cl.
CPC ................ *B60S 5/06* (2013.01); *G05B 19/05* (2013.01)

(58) Field of Classification Search
CPC ....... B60S 5/06; Y02T 90/124; B60L 11/1822
See application file for complete search history.

(56) References Cited

U.S. PATENT DOCUMENTS

| 3,566,798 A * | 3/1971 | Peitzman | ................ | B60S 13/02 104/44 |
| 4,608,929 A * | 9/1986 | Park | ........................ | B60S 13/02 104/38 |

(Continued)

FOREIGN PATENT DOCUMENTS

| CN | 1605514 | 4/2005 |
| CN | 101284524 | 10/2008 |

(Continued)

OTHER PUBLICATIONS

Machine translation of CN 10290694 accessed via espacenet on Sep. 29, 2016.*

(Continued)

*Primary Examiner* — Michael McCullough
*Assistant Examiner* — Mark Hageman
(74) *Attorney, Agent, or Firm* — Vierra Magen Marcus LLP (57) ABSTRACT

A battery replacement robot with a mobile storage rack includes a mechanical part and an electrical control part. The electrical control part controls a battery replacement device to place, in one step, all battery boxes required by one side of an electric bus that needs battery replacement onto a battery box storage rack. A horizontal moving unit moves to a position where a battery needs to be replaced. A battery box replacement device takes down a spent battery box from the electric bus; the battery box replacement device rotates towards one side around a Y axis, and raises or lowers the (Continued)

spent battery box so as to put the spent battery on the battery box storage rack; then the battery box replacement device takes down a charged battery box from the battery box storage rack, rotates to the original position, and installs the battery box in the electric bus.

5 Claims, 7 Drawing Sheets

(56) References Cited

U.S. PATENT DOCUMENTS

| | | | |
|---|---|---|---|
| 5,545,967 A | 8/1996 | Osborne et al. | |
| 7,240,620 B2* | 7/2007 | Yatsko | B60S 13/02 104/44 |
| 7,938,612 B2* | 5/2011 | Springston | B60S 5/06 414/347 |
| 8,022,666 B2* | 9/2011 | Li | B60L 11/185 104/34 |
| 2011/0113609 A1 | 5/2011 | Berdelle-Hilge | |

FOREIGN PATENT DOCUMENTS

| | | |
|---|---|---|
| CN | 201136484 | 10/2008 |
| CN | 101890942 | 11/2010 |
| CN | 201769792 | 3/2011 |
| CN | 102152776 | 8/2011 |
| CN | 102180143 | 9/2011 |
| CN | 102275573 | 12/2011 |
| CN | 102490694 | 6/2012 |
| CN | 102700513 | 10/2012 |
| CN | 202641653 | 1/2013 |
| WO | WO2010/142688 | 12/2010 |

OTHER PUBLICATIONS

PCT International Search Report dated Aug. 20, 2013, PCT Application No. PCT/CN2013/076054.
English Abstract of Chinese Patent Application No. CN1605514.
English Abstract of Chinese Patent Application No. CN101284524.
English Abstract of Chinese Patent Application No. CN101890942.
English Abstract of Chinese Patent Application No. CN102152776.
English Abstract of Chinese Patent Application No. CN102180143.
English Abstract of Chinese Patent Application No. CN102275573.
English Abstract of Chinese Patent Application No. CN102490694.
English Abstract of Chinese Patent Application No. CN102700513.
English Abstract of Chinese Patent Application No. CN201136484.
English Abstract of Chinese Patent Application No. CN201769792.
English Abstract of Chinese Patent Application No. CN202641653.
Office Action with English translation of Search Report Section dated Jan. 14, 2014 in Chinese Patent Application No. 201210223420.7, 9 pages.
Extended European Search Report dated Jun. 18, 2015 in European Patent Application No. 13809029.5, 6 pages.

* cited by examiner

BATTERY REPLACEMENT ROBOT WITH MOBILE STORAGE RACK AND BATTERY REPLACEMENT METHOD

This application is a National Stage application of PCT international application PCT/CN2013/076054, filed on May 22, 2013 which claims priority to Chinese patent application No. 201210223420.7 titled "BATTERY REPLACEMENT ROBOT WITH MOBILE STORAGE RACK AND BATTERY REPLACEMENT METHOD", filed with the Chinese State Intellectual Property Office on Jun. 29, 2012, both of which are incorporated herein by reference in their entireties.

TECHNICAL FIELD

The present application relates to a robot for replacing a battery box, and particularly to a battery replacement robot with a mobile storage rack and a battery replacement method.

BACKGROUND

As a technology for charging and replacing a battery of an electric vehicle is improved and the electric vehicle is popularized, the electric vehicle will gradually become a focus of Chinese automobile industry and energy development. Presently, an energy supply for the electric vehicle mainly includes: charging the battery and replacing the battery. The method for charging the battery has a disadvantage of a long waiting time. In terms of current development situation, in order to solve a problem of an endurance mileage of the electrical vehicle, the method for replacing the battery of the electrical vehicle is more feasible.

When a battery replacement for an electrical bus is performed, due to a limitation of a capacity of a single battery box, a combination of multiple battery boxes are generally used to supply electric power. However, the battery boxes are heavy and have a great quantity, and thus the replacement of the battery boxes is difficult. Therefore, the battery box replacement has become a technical problem of industrialization development of the electrical bus. In order to solve this technical problem, a system for fast replacing a battery box is required, which can replace all of battery cells in 7 to 8 minutes.

At present, domestic enterprises have researched on a system for replacing a battery box of an electrical bus to a certain extent.

Chinese Patent CN 101284524A provides a solution, which solves a problem of a battery box replacement by rotating the battery box by 180° through a battery replacement mechanism. However, this manner has disadvantages of long travel, large operating space, long operating time.

Some devices described in Chinese Patent 200820078476.7, titled "positioning device for battery replacement system of on-board battery"; and Chinese Patent 200410090796.0, titled "electrical bus system" have many problems in an implementation. For example, some design solution is just in a stage of theory, the process of positioning may be performed for many times in the battery box replacement, and the battery box replacement spends a long time. The battery replacement device has a poor expandability, i.e., battery boxes in different vehicles cannot be replaced by the same battery replacement device. In addition, a high of the related battery replacement device is limited, which cannot satisfy the requirement of a large-scale concentration type battery replacement station.

Chinese Patent CN 101890942A provides a device, which occupies a large area, and needs to cooperate with multiple robots or mechanisms to achieve the battery replacement.

Some progresses of the battery replacement device are provided in the existing technologies, but there are still some problems.

(1) Complex control, high failure rate and expensive maintenance cost.

In the existing technologies, the battery box is replaced through various robots and various structures, by performing the cooperation, the positioning and the repetition many times. In this way, this necessarily results in that the entire battery replacement system has a large coverage area, a high requirement for a positioning accuracy, a long operation time for the replacement, and a high complexity. The process of battery replacement may be implemented by complexly cooperating with various mechanisms, and thus the failure rate and the maintenance cost are correspondingly increased, which is adverse to promoting the electric vehicle.

(2) Long operation time for battery replacement, low battery replacement efficiency The battery replacement robot can deliver and replace only one battery box at once, and the battery box to be replaced cannot be placed adjacent the battery replacement robot. In practice, the battery replacement robot has to move reciprocally between the battery box storage rack and the electric vehicle in which the battery replacement is to be replaced. With an extension of the travel of the robot, the operation time of the battery replacement is prolonged, thereby significantly reducing the battery replacement efficiency, and impeding the promotion of the electrical vehicle.

(3) In a solution in which multiple battery boxes are delivered at once, the battery replacement robot has a large weight and volume. The problems of how to control the battery replacement robot with a large inertia accurately and how to improve the reliability and efficiency of the battery replacement robot with a large weight cannot be solved by the existing technologies.

SUMMARY

The object of the disclosure is to solve the above problems. In view of this, a battery replacement robot with a mobile storage rack and a battery replacement method are provided. According to the disclosure, a battery replacement task achieved by cooperating with various battery replacement robots is integrated in one robot. A battery box storage rack is installed on a body of the battery replacement robot, and the batteries to be replaced are all placed on the battery storage rack, so as to effectively shorten the travel of the robot in the battery replacement. In this way, the structure is simplified, a coordination time of various battery replacement robots and the operation time are shorten, the operations of the original various robots with various structures, which is implemented by performing the cooperation, the positioning and the repetition many times, are replaced in one step. The problem of controlling a robot with the large inertia accurately is solved by a speed planning. During the battery replacement, a multi-axis linkage can achieved in the battery replacement robot, thus further improving the reliability and the efficiency of the battery replacement device.

In order to achieve the above object, the disclosure discloses the following technical solution.

A battery replacement robot with a mobile storage rack is provided, which includes a mechanical part and an electric control part, where the mechanical part includes a horizontal mobile unit which is movable in X, Y and Z coordinate axis directions in a rectangular coordinate system, a bearing unit and a carrier unit; a middle portion of the carrier unit is hollow, and a battery box replacement device is installed in a middle of the hollow portion of the carrier unit; and a console is arranged on the horizontal mobile unit;

a battery box storage rack is provided on at least one side of the horizontal mobile unit, the electric control part controls the battery box replacement device to take full-charged battery boxes at once, place the battery boxes on the battery box storage rack and move the battery boxes to a standby position of a battery replacement; remove a discharged battery box from a vehicle, place the discharged battery box on the battery box storage rack, take one full-charged battery box from the battery box storage rack, install the full-charged battery box in a corresponding position; and repeat the above steps to replace all battery boxes.

At least one set of wheels is provided each of two sides of the horizontal mobile unit, and the wheels are installed at two sides of a lower beam to cooperate with ground rails; the ground rails are uniformly distributed in several rows, and a limit block is disposed at an end of the ground rail; the wheels are connected to a motor reducer, and the motor reducer is arranged on the lower beam and connected to a servo motor moving in a horizontal direction; and the servo motor moving in the horizontal direction is connected to the electric control part.

The bearing unit includes a gantry structure including an upper beam and two stand columns, two sets of transverse guide wheels are provided on the upper beam, and a top rail is sandwiched between the two sets of transverse guide wheels and is installed on a rechargeable battery rack; a sliding-contact line slot is installed on the top rail and adapted to supple power to a device, and a horizontal addressing chip is installed on the top rail and adapted to address an operating position in the horizontal direction; a lifting device is a set of winches arranged on the two stand columns and driven by a servo motor, a wire rope is wound around the winch, and a support is provided on the carrier unit and connected to a lower end of the wire rope; and a longitudinal addressing chip is provided on at least one of the stand columns and adapted to perform an identification in a longitudinal direction to perform an addressing vertically.

The carrier unit includes an objective table, a middle portion of the objective table is hollow, and the battery box replacement device is installed at the hollow middle portion of the objective table; and a support is provided at each of two sides of the objective table, a plurality sets of longitudinal guide wheels are arranged inside the support, and a plurality of limit wheels are arranged outside the support and adapted to cooperate with the bearing unit.

The battery box replacement device includes a horizontal rotary table, the horizontal rotary table is a round plate, connected to a servo driving motor for horizontal rotary via a gear reduction mechanism; a working surface is provided on the round plate, a battery box pushing mechanism is arranged on the working surface, a supporting beam is arranged on the battery box pushing mechanism, and the supporting beam is connected with a battery box tray; the battery box pushing mechanism includes at least two guide rails provided in parallel, a battery box pushing mechanism driving motor, a battery box driving mechanism and an electromagnetic pusher, and the battery box driving mechanism is a pinion-and-rack mechanism; the battery box pushing mechanism driving motor and the electromagnetic pusher are connected to the respective pinion-and-rack mechanisms; two round electromagnetic chucks are installed on a pusher working surface of the electromagnetic pusher and distributed at two ends of the working surface, and the two round electromagnetic chucks are located to corresponding positions of two round iron blocks of the battery box; an unlocking mechanism is provided on the pusher working surface of the electromagnetic pusher and adapted to cooperate with a locking device of a battery inner box; the guide rails are arranged on a top surface of the battery box pushing mechanism; the guide rails match with the battery box; the battery box is a case, in which batteries are arranged in groups; at least one ultrasonic distance measuring sensor is provided at each of two ends of the supporting beam; and the servo driving motor for horizontal rotary, the battery box pushing mechanism driving motor, the electromagnetic chucks and the sensors are all connected to the electric part.

The gear reduction mechanism includes a big gear and a pinion engaged with each other, and a reducer, the big gear is connected to the round plate, the pinion is connected to an output shaft of the reducer, the reducer is connected to the servo motor for horizontal rotary, and the servo motor for horizontal rotary is connected to the electric part.

The unlocking mechanism has a shifting fork structure driven by an unlocking motor; two ends of the working surface of the electromagnetic pusher are provided with the unlocking mechanisms which cooperate with each other to unlock the locking device inside the battery inner box on the rechargeable battery rack or the vehicle in which battery is to be replaced.

The electric control part includes a master computer system, a PLC logic controller, a limit switch, an emergency stop switch, a servo motor, a servo driver, a motor encoder, an ultrasonic sensor, a color mark sensor, a photoelectric sensor, a DMP position sensor, a wireless communication module I, and a wireless communication module II. The master computer system includes an industrial personal computer and a touch screen, and the industrial personal computer is connected to the wireless communication module I through a serial port;

the PLC logic controller is electrically connected to the servo driver, the emergency stop switch, the ultrasonic sensor, the color mark sensor, the photoelectric sensor and the DMP position sensor; and communicates with the master computer system through the serial port, to perform a logic control on a movement of the robot.

The ultrasonic sensor is electrically connected to the PLC logic controller, and adapted to detect a distance between the electromagnetic pusher and the battery box;

the color mark sensor is electrically connected to the PLC logic controller, and adapted to detect a locking state of a battery;

the DMP position sensor is electrically connected to the PLC logic controller; and adapted to detect a deviation between the electromagnetic pusher and a reflector at the rechargeable battery box rack, and a deviation between the electromagnetic pusher and a reflector at a battery box compartment of a vehicle body, and feed back deviation data to the PLC, to control the electromagnetic pusher to adjust posture and accurately grip and install the battery box.

The photoelectric sensor is electrically connected to the PLC logic controller; and adapted to position the movements of the robot in the X axis direction and the Y axis direction and control accelerations or decelerations of the movements in the X axis direction and the Y axis direction in conjunction with the addressing chips, to accurately control the robot with the large inertia in a high speed.

The emergency stop switch is electrically connected to the PLC logic controller, and adapted to urgently stop the robot in an emergency case.

A power driving mechanism includes five servo drivers, the servo drivers are connected to the servo motors for the horizontal mobile unit, the carrier unit, the bearing unit and the horizontal rotary unit, respectively; an encoder is provided at a shaft of each servo motor, a signal output end of the encoder is connected to the PLC logic controller; and a limit switch is provided at each of working zero positions of the horizontal mobile unit, the carrier unit and the bearing unit; and the limit switches are connected to the PLC logic controller;

the wireless communication module I and the wireless communication module II are respectively located on the industrial personal computer of the master computer system, and a wireless rocker, to wirelessly transmit data between the wireless communication module I and the wireless communication module II.

A battery replacement method using the battery replacement robot with the mobile storage rack is provided, which includes:

1) initialization, includes: after a system is powered on, issuing a reset instruction by a master computer system, a console or a wireless remote control device; and triggering limit switches on shafts of the battery replacement robot with the mobile storage rack to perform a homing and return components of the battery replacement robot to initial positions;

taking a battery box from a rechargeable battery rack unit, includes: moving the battery replacement robot along an X axis direction and a Y axis direction to a position of received coordinates of a full-charged battery box under a control of a PLC logic controller, according to the received coordinates; rotating a horizontal rotary table by +180° or −180°; adjusting a posture of a battery box tray according to signals from a DMP position sensor and an ultrasonic sensor; taking the full-charged battery from the rechargeable battery rack by an electromagnetic chuck of an electromagnetic pusher in a carrier unit; rotating the horizontal rotary table by +90° or −90°; controlling the battery replacement robot by the PLC logic controller according to a stored coordinate point and a photoelectrical sensor; adjusting the posture of the battery box tray according to the signals from the DMP position sensor and the ultrasonic sensor, to accurately place the battery box on a battery box storage rack; repeating the above steps to take all of the battery boxes required by one side of a vehicle; moving the battery replacement robot along the X axis direction after the battery storage rack is filled with the required battery boxes; and simultaneously rotating a horizontal rotary device along the Y axis direction automatically to switch the battery replacement robot to an initial state of a battery replacement;

2) unloading a battery box of a vehicle, in which the battery is to be replaced, includes: after the vehicle is stopped in a certain standby position of a battery replacement, moving the battery replacement robot horizontally to a certain operation point by the master computer system, the robot console or the wireless remote control device, according to information of the stored coordinate point; adjusting the posture of the battery box tray according to the signals from the DMP position sensor and the ultrasonic sensor, to accurately extend the battery box tray to a position flushing with a battery compartment of a vehicle body; transmitting a signal of a rotating angle of the horizontal rotary table to the PLC logic controller to store the signal; determining whether the discharged battery box is unlocked, according to a feedback signal from a color mark sensor; removing the battery from the battery compartment of the vehicle body by the electromagnetic chucks of the electromagnetic pusher in the carrier unit, in the case that the discharged battery box is unlocked; rotating the horizontal rotary table by +90° or −90°; transmitting the signal of position of the horizontal rotary table to the PLC logic controller to store the signal; controlling the battery replacement robot by the PLC logic controller according to the stored coordinate point and the photoelectrical sensor, adjusting the posture of the battery tray according to the signals from the DMP position sensor and the ultrasonic sensor, to accurately place the battery box in the battery box storage rack;

3) installing battery, includes: controlling the movement of the battery replacement robot by the PLC logic controller to rotate the battery replacement robot to a position corresponding to the battery compartment of the vehicle body; adjusting the posture of the battery box tray according to the stored position of the horizontal rotary table; installing the battery box in the battery compartment; determining whether the battery box is locked according to a detected signal from the color mark sensor; powering down the electromagnetic chuck under the control of the PLC logic controller; detaching the electromagnetic chuck from the battery; and retracting the electromagnetic pusher along the objective table and fixing the electromagnetic pusher, to replace one battery box; repeating the above steps until all of the discharged battery boxes are replaced; and then returning the battery replacement robot with mobile storage rack to standby at an initial position.

The disclosure has the following beneficial effects.

1. In the process of the battery replacement, work tasks, which are performed by cooperating various robots and various structures, can be integrated into one robot. The robot is provided with a battery box storage rack on at least one side thereof, which can take all of the battery boxes which are required on one side of the electrical bus at once. In this way, it is avoided to repeat the operation of the battery replacement robot in a large space and at a long distance, and the operation time of the battery replacement is shortened.

2. Short operation time of the battery replacement and high efficiency of the battery replacement. In the process of the battery replacement, a multi-axis linkage can be achieved in the battery replacement robot, the horizontal mobile unit and the horizontal rotary device moves simultaneously, thus shortening the operation time of the battery replacement and improving the efficiency of battery replacement.

3. The problem of accurate control for the device with a large inertia is solved by speed planning.

The photoelectric sensor of the battery replacement robot is electrically connected to the PLC logic controller, in conjunction with the addressing chip, to position the movement of the robot in the X axis direction and in the Y axis direction, and control accelerations and decelerations of the movement in the X axis direction and in the Y axis direction, thus accurately controlling the robot with the large inertia in the high speed.

With the battery replacement robot with the mobile storage rack according to the disclosure, the operation time of the battery replacement is shorten, the mechanism is simplified, an efficiency is improved and an occupancy rate of the working area is reduced, and a use ratio of land resources is effectively increased. The battery replacement robot may adjust the posture according to the position of the battery on the electrical bus, to automatically identify the position of the battery and replace the battery of the electrical bus fast, accurately and safely. The process of the battery replacement has a high positioning precision and a small relative displacement, and determines a position accurately, which can achieve a fast battery box replacement on various types of the electrical buses.

BRIEF DESCRIPTION OF THE DRAWINGS

In FIGS. 1-8,

| | | | |
|---|---|---|---|
| 1 | battery replacement robot with movable storage rack, | | |
| 2 | rechargeable battery rack unit, | | |
| 3 | electrical bus to be performed battery replacement, | | |
| 101 | horizontal mobile unit, | | |
| 102 | bearing unit, | 103 | carrier unit, |
| 4 | ground rail, | 5 | limit collision block, |
| 6 | support, | 7 | wheel, |
| 8 | lower beam, | 9 | console, |
| 10 | objective table, | 11 | unlocking mechanism, |
| 12 | battery box storage rack. | 14 | reducer, |
| 15 | top rail, | 16 | upper beam, |
| 17 | stand column, | 18 | transverse guide wheel, |
| 19 | battery pushing mechanism, | 20 | supporting beam, |
| 21 | horizontal rotary table, | 22 | guide rail, |
| 23 | battery box driving mechanism, | | |
| 24 | battery box pushing mechanism driving servo motor, | | |
| 25 | electromagnetic pusher, | 26 | electromagnetic chuck, |
| 27 | ultrasonic sensor, | 28 | longitudinal guide wheel, |
| 501 | master computer system, | 502 | PLC logic controller, |
| 503 | limit switch, | 504 | servo motor, |
| 505 | servo driver, | 506 | motor encoder, |
| 507 | emergency stop switch, | 508 | ultrasonic sensor, |
| 509 | color mark sensor, | 510 | photoelectric sensor, |
| 511 | DMP position sensor, | 512 | wireless communication module I |
| 513 | wireless communication module II. | | |

DETAILED DESCRIPTION OF EMBODIMENTS

Embodiments of the application will be further described in conjunction with drawings as followings.

Figure 1:
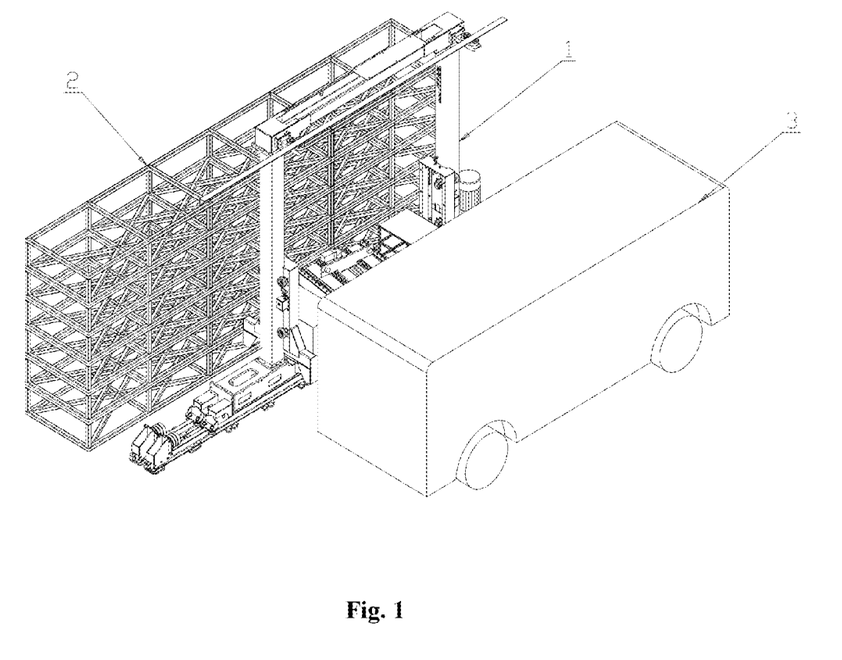
FIG. 1 is a structural schematic view of a battery replacement system according to the disclosure.

FIG. 1 shows a rechargeable battery rack unit 2 on which a rechargeable battery box is placed, and a battery replacement robot 1 with a movable storage rack, where the battery replacement robot 1 cooperates with the rechargeable battery rack unit 2. The battery replacement robot 1 with the movable storage rack moves along a length direction of the rechargeable battery rack unit 2. The battery replacement robot 1 with the movable storage rack takes all of the battery boxes required on one side of an electrical bus from the rechargeable battery rack unit 2 at once, moves a standby position of a battery replacement for the electrical bus in an X axis direction, and remove a discharged battery to be replaced from the electrical bus by cooperating among multiple sensors. The battery replacement robot 1 with the movable storage rack rotates the discharged battery by +90° or −90° to place it on a battery storage rack 12. Then, the battery replacement robot 1 with the movable storage rack raises or falls according to a distance between coordinates stored by the PLC logic controller 502, to take a charged battery box from the battery box storage rack 12; rotates the charged battery box by +90° or −90° to return, and adjusted the charged battery box to the position to be replaced, by multiple sensors. In this way, the battery box of the electrical bus is replaced.

Figure 2:
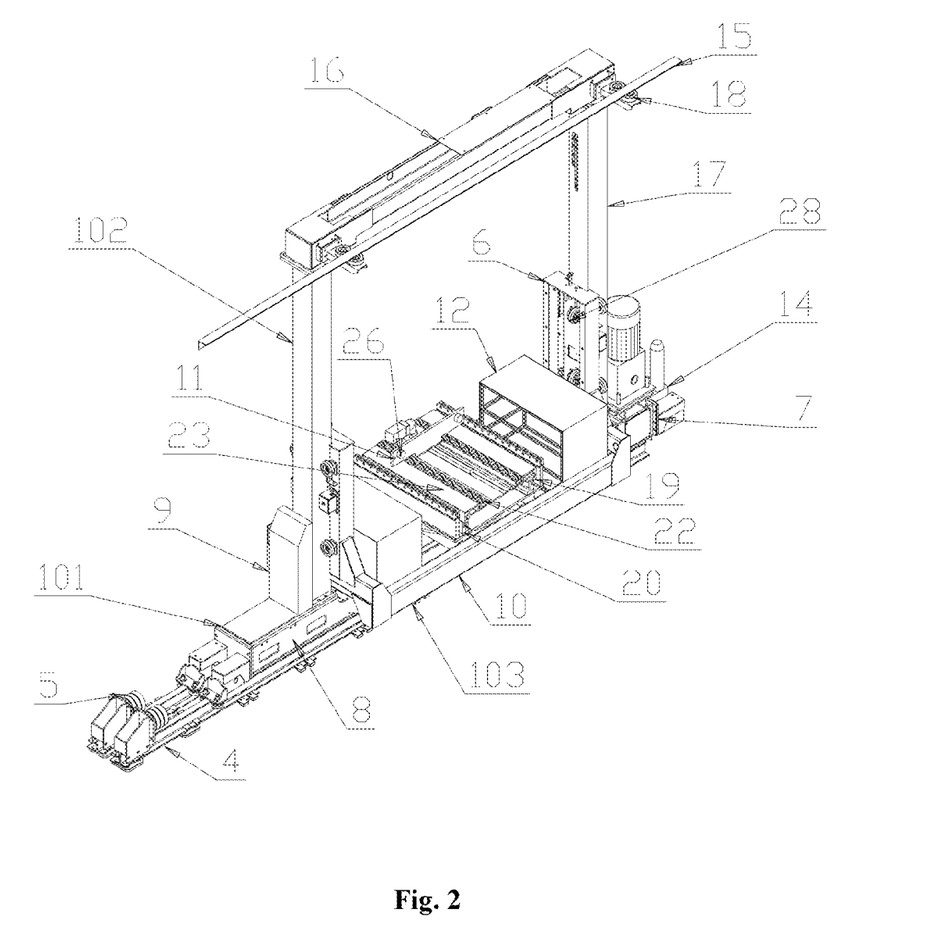
FIG. 2 is a schematic view of a battery replacement robot with a movable storage rack according to the disclosure.

FIG. 2 illustrates a structural schematic view of a battery replacement robot with a mobile storage rack. As shown in FIG. 2, a mechanical part includes a horizontal mobile unit 101, a carrier unit 103 and a bearing unit 102. The horizontal mobile unit 101 includes a wheel 7 with flanges provided at two sides thereof, and a ground rail 4 connected with a lower beam 8. A limit collision block 5 is arranged at an end of the ground rail 4. The wheel 7 is connected to a reducer 14. The reducer 14 is arranged on the lower beam 8 and is connected to a servo motor moved in a horizontal direction.

The bearing unit 102 is arranged at an upper portion of the horizontal mobile unit 101. The carrier unit 103 is connected with the bearing unit 102. The carrier unit 103 includes an objective table 10, and a battery box replacement device arranged on the objective table 10. The battery box replacement includes a battery box driving mechanism 23. A battery box pushing mechanism 19 is arranged on the battery box driving mechanism 23.

The electric control part includes a data collection device, a power driving mechanism, and a wireless communication module I 512, which are all connected to a master computer system 501. The power driving mechanism is connected to the horizontal mobile unit 101, the bearing unit 102, the carrier unit 103 and a driving device of the battery box replacement device in the mechanical part.

The bearing unit 102 includes a gantry structure mainly including an upper beam 16 and two stand columns 17. Two sets of transverse wheels 18 are arranged on the upper beam 16. A top rail 15 is sandwiched between the two sets of transverse wheels 18 and is installed on the rechargeable battery rack. A sliding-contact line slot is installed on the top rail 15 and adapted to supply power to a device. A horizontal addressing chip is installed on the top rail 15 and adapted to address an operating position in the horizontal direction. A winch is arranged on one of the two stand columns 17 and driven by a servo motor. A wire rope is wound around the winch. A lower end of the wire rope is connected to a top end of a support 6 of the carrier unit 103. A longitudinal addressing chip is provided at one of the stand columns and adapted to perform an identification in a longitudinal direction to perform an addressing vertically.

Figure 3:
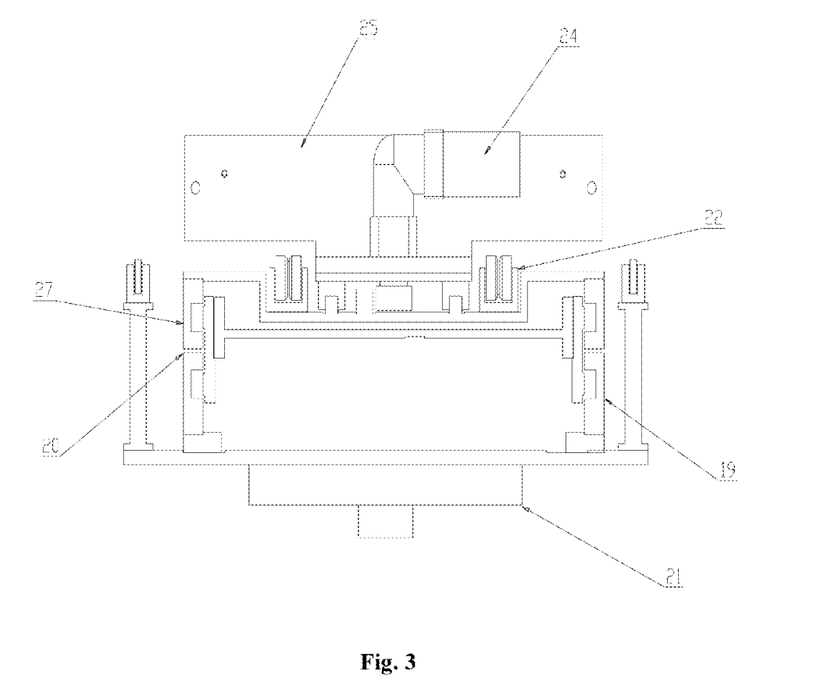
FIG. 3 is a schematic rear view showing a structure of a carrier of the battery replacement robot according to the disclosure.
Figure 4:
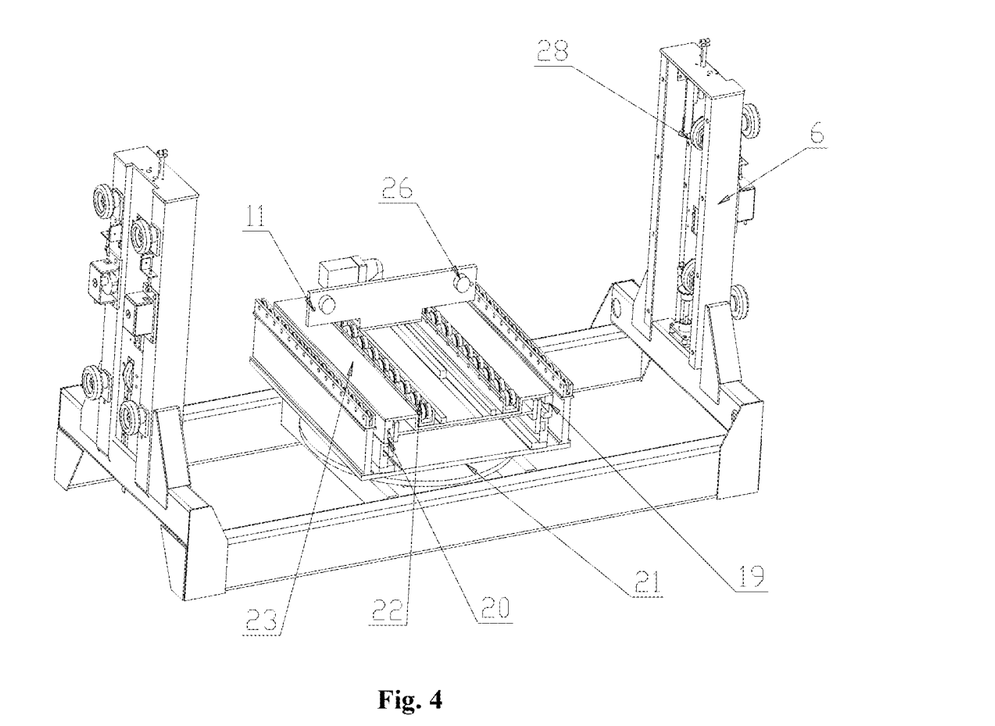
FIG. 4 shows a carrier unit according to the disclosure.
Figure 5:
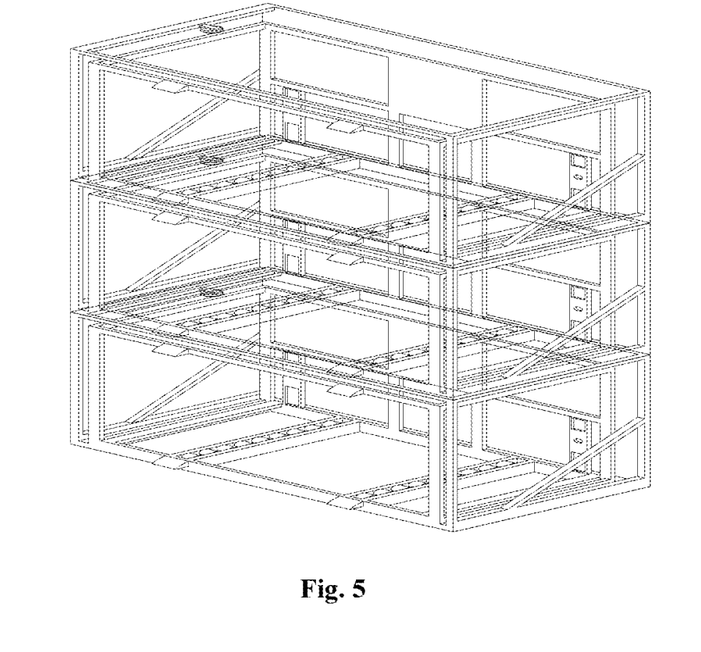
FIG. 5 is a schematic of a battery box storage rack.

In FIGS. 3 and 4, the battery box driving mechanism 23 includes a horizontal rotary table 21 arranged on the objective table 10. A battery box pushing mechanism 19 is arranged beneath one side of the objective table 10. A support beam 20 is arranged on the battery box pushing mechanism 19. The support beam 20 is connected to a battery box tray. In FIG. 4, a support 6 is provided at each end of the objective table 10. Multiple sets of longitudinal guide wheels 28 are arranged at the support 6.

The battery box pushing mechanism 19 includes a guide rail 22, a servo motor for battery box pushing mechanism 24 and an electromagnetic pusher 25. The servo motor for battery box pushing mechanism 24 and the electromagnetic pusher 25 are connected to pinion-and-rack mechanism, respectively. Two round electromagnetic chucks are installed on a pusher working surface of the electromagnetic pusher 25 and distributed on two ends of the working surface. The two round electromagnetic chucks 26 are located to corresponding positions of two round iron blocks of the box inner box. An unlocking mechanism 11 is provided on the pusher working surface of the electromagnetic pusher 25, and adapted to cooperate with a locking device of the battery inner box. The guide rail 22 is arranged on an upper surface of the battery box pushing mechanism 19.

The unlocking mechanism 11 has a shifting fork structure driven by an unlocking motor. Two ends of the working surface of the electromagnetic pusher are provided with the unlocking mechanisms which cooperate with each other to unlock the locking device inside the battery inner box on the rechargeable battery rack or the vehicle in which battery is to be replaced.

Two ultrasonic sensors 27 are provided at two end of the support beam 20, respectively.

Figure 6:
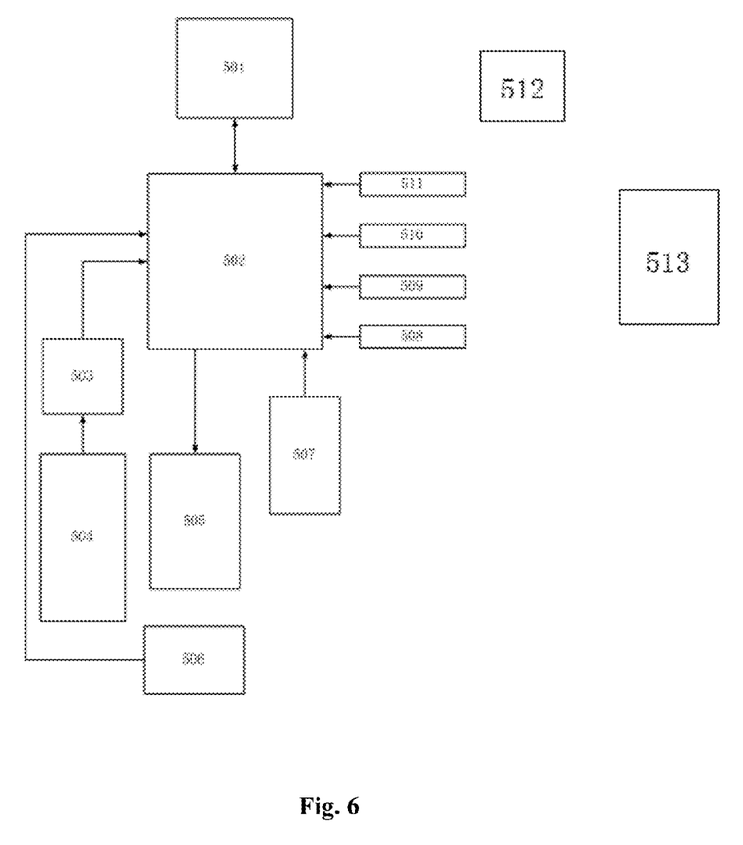
FIG. 6 is a schematic view of a control system of a battery replacement robot according to the disclosure.

In FIG. 6, the electric system includes a master computer system 501, a PLC logic controller 502, a limit switch 503, five servo drivers 505 for respective motors, a motor encoder 506, an emergency stop switch 507, an ultrasonic sensor 508, a color mark sensor 509, a photoelectric sensor 510, and a DMP position sensor 511.

The master computer system 501 includes an industrial personal computer and a software system. An X86 series industrial personal computer can be used as a host, and Windows XP is used as a control software system. The control software system programs in Visual C++. Multi-threaded transaction processing can be performed by the software. An operator can operate the master computer through a touch screen.

A Siemens PLC 300 logic controller may be a core component of an entire control system, which communicates with the master computer system 501 via a wireless network and is adapted to control the respective driving motors, by performing a comprehensive judgement based on signals from the ultrasonic sensor 508, the color mark sensor 509, the photoelectric sensor 510, the DMP position sensor 511.

The data collection device includes the ultrasonic sensor 508, the photoelectric sensor 510, the color mark sensor 509 and the DMP position sensor 511.

The ultrasonic sensor 508, the color mark sensor 509 and the DMP position sensor 511 are installed on the electromagnetic pusher 25. The photoelectric sensor 510 is installed on the upper beam 16 and the stand column 17, and adapted to position the robot in the X axis direction and the Y axis direction.

The limit switch 503 serves as a mechanical reference point for each motion shaft. Each servo driver 505 may monitor a running current of the respective servo motor 504; and send an alarm to the controller in a case of a locked rotor or an overload of a motor. When the system fault occurs, a movement control system can autonomously determine the state of fault and report the content of the fault to a monitoring system of the host. The emergency stop switch 507 is adapted to urgently stop the equipment when an emergency is happened in the operation process. The operation of emergency stop switch 507 has a highest priority.

The battery box driving mechanism 23 of the battery replacement robot with the mobile storage rack includes the supporting beam 20, the horizontal rotary table 21 and the battery box pushing mechanism 19. The battery box pushing mechanism 19 is driven by a battery box pushing mechanism driving motor.

The limit switches 503 are connected to the PLC logic controller 502. The limit switches 503 are disposed at working zero positions of the horizontal mobile unit, the carrier unit 103 and the bearing unit 102. The limit switches 503 are contacted with and connected to the respective servo motors 504.

Figure 7:
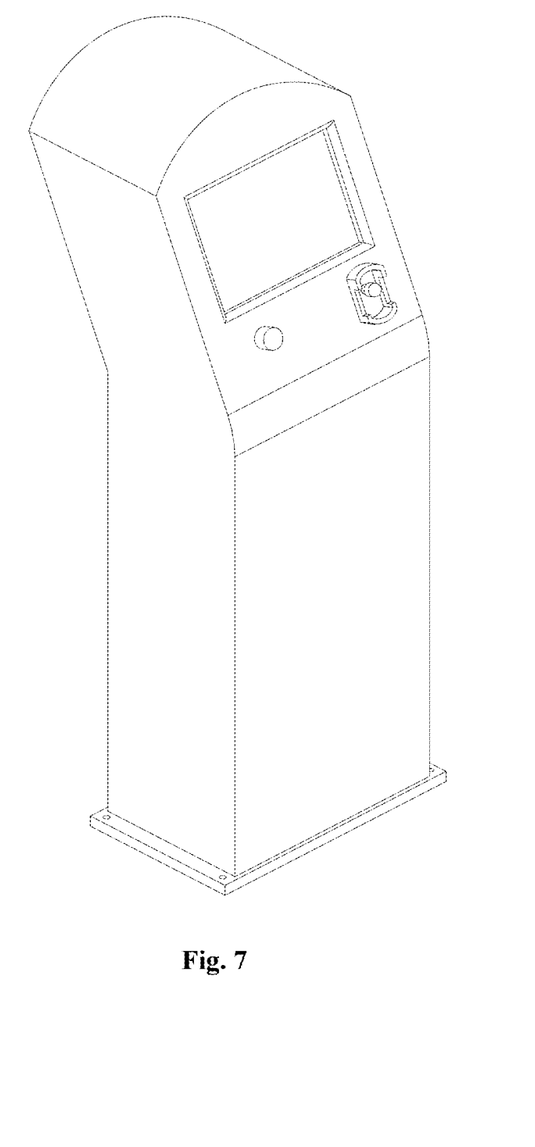
FIG. 7 is a schematic view of a console according to the disclosure.

The console 9 includes a cabinet. The industrial personal computer is installed at a bottom of the cabinet. A resistance-type touch screen is arranged on an upper portion of a front face of the cabinet. A wireless communication module II 513 is installed on a back surface of the cabinet. An indicator of an operating state and an emergency stop button are disposed below the touch screen on the cabinet. The resistance-type touch screen and the wireless communication module II 513 are connected to the industrial personal computer. The indicator of the operating state and the emergency stop button are connected to the industrial personal computer via a level conversion circuit board.

A cabinet door is arranged at the back face of the cabinet, and a rain-proof lock is disposed on the cabinet door.

The industrial personal computer is connected to the resistance-type touch screen through a VGA port.

The wireless communication module II 513 communicates with the industrial personal computer through a network port.

The wireless communication module II 513 and the wireless communication module I 512 performs the communication through a wireless network adopted WiFi in IEEE 802.11 standard, CDMA module or EDGE module.

A wireless remote control device may further be provided on the master computer system 501. The wireless remote control device includes a housing. A master switch, two two-dimensional rockers, a start button, a stop button and a servo controller power button are disposed on the housing. A main control board and the wireless communication module II 513 are disposed inside the housing. The master switch, the two two-dimensional rockers, the start button, the stop button, the servo controller power button and the wireless communication module II 513 are connected to the main control board. The main control board converts direction information of the two-dimensional rocker into an electrical signal. Instructions are transmitted and received by the wireless communication module II 513, to control the movement of the robot. A state indicator is disposed on the housing, and connected to the main control board. An emergency stop button is disposed on the housing and connected to the main control board. An emergency button is provided on the housing.

The host includes the wireless communication module I 512, which performs a wireless communication with the wireless communication module II 513 of the remote control device.

Figure 8:
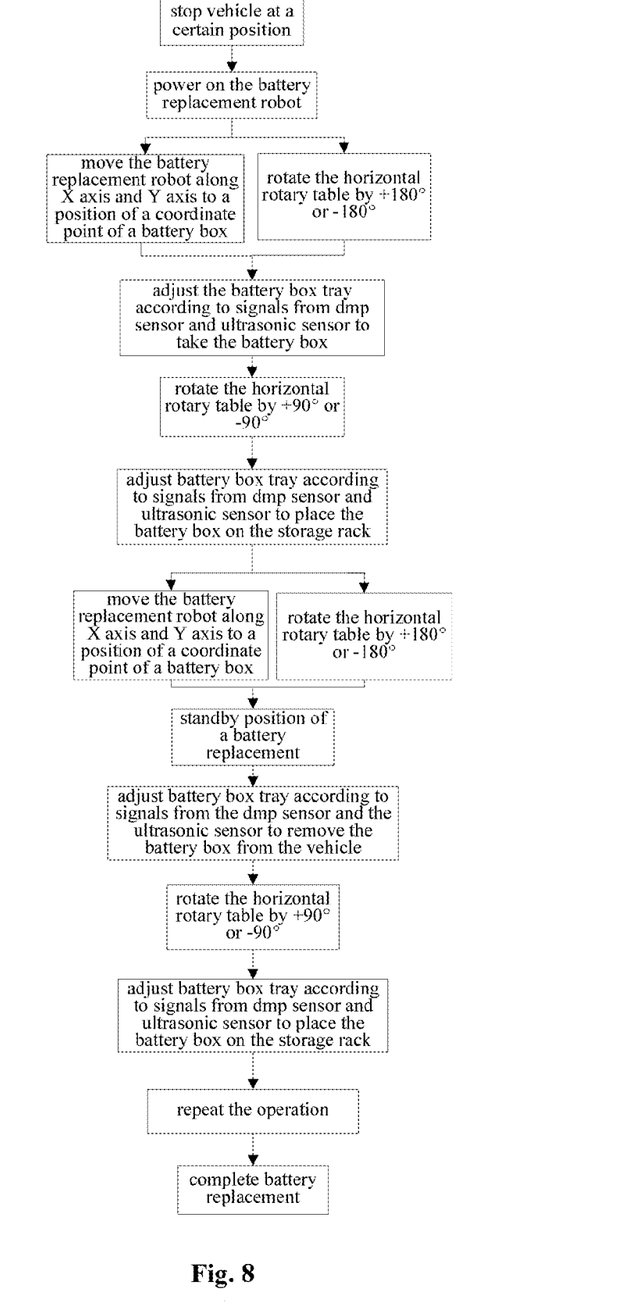
FIG. 8 is a flow diagram of a battery replacement process.

A battery replacement method of a battery replacement robot with a mobile storage rack includes following steps.

1) initialization, includes: after a system is powered on, issuing a reset instruction by a master computer system 501, a console or a wireless remote control device; and triggering limit switches 503 on shafts of the battery replacement robot with the mobile storage rack, to perform a homing and return components of the battery replacement robot to original positions;

taking a battery box from a rechargeable battery rack unit, includes: moving the battery replacement robot along an X axis direction and a Y axis direction to a position of received coordinates of a full-charged battery box under the control of a PLC logic controller 502, according to the received coordinates; rotating a horizontal rotary table 21 by +180° or −180°; adjusting a posture of a battery box tray according to signals from a DMP position sensor 511 and an ultrasonic sensor 508; taking the full-charged battery from the rechargeable battery rack unit 2 by an electromagnetic chuck 26 of an electromagnetic pusher 25 in a carrier unit 103; rotating the horizontal rotary carrier 21 by +90° or −90°; controlling the battery replacement robot by the PLC logic controller 502 according to a stored coordinate point and the photoelectrical sensor 510 adjusting the posture of the battery box tray according to the signals from the DMP position sensor 511 and the ultrasonic sensor 508, to accurately place the battery box on a battery box storage rack 12; repeating the above steps to take all of the battery boxes required by one side of a vehicle; moving the battery replacement robot along the X axis direction after the battery storage rack is filled with the required battery boxes; and simultaneously rotating a horizontal rotary device along the Y axis direction to switch the battery replacement robot to an initial state of a battery replacement.

2) unloading a discharged battery of the vehicle, in which the battery is to be replaced, includes: after the vehicle is stopped in a certain standby position of a battery replacement, moving the battery replacement robot 1 with the mobile storage rack horizontally to a certain operation point by the master computer system 501, the robot console or the wireless remote control device according to information of the stored coordinate point; adjusting the posture of the battery box tray according to the signals from the DMP position sensor 511 and the ultrasonic sensor 508, to accurately extend the battery box tray to a position flushing with a battery compartment of a vehicle body; transmitting a signal of a rotating angle of the horizontal rotary carrier 21 to the PLC logic controller 502 to store the signal; determining whether the discharged battery box is unlocked, according to a feedback signal from a color mark sensor 509; removing the battery from the battery compartment of the vehicle body by the electromagnetic chuck 26 of the electromagnetic pusher 25 in the carrier unit 103, in the case that the discharged battery box is unlocked; rotating the horizontal rotary table by +90° or −90°; transmitting the signal of a position of the horizontal rotary table to the PLC logic controller 502 to stored the signal; controlling the battery replacement robot to move by the PLC logic controller 502 according to the stored coordinate point and the photoelectrical sensor 510; adjusting the posture of the battery tray according to the signals from the DMP position sensor 511 and the ultrasonic sensor I 508, to accurately place the battery box in the battery box storage rack 12;

3) installing battery, includes: controlling the movement of the battery replacement robot by the PLC logic controller 502 to rotate the battery replacement robot to a position corresponding to the battery compartment of the vehicle body; adjusting the posture of the battery box tray according to the stored position of the horizontal rotary carrier 12; installing the battery box in the battery compartment; determining whether the battery box is locked according to a detected signal from the color mark sensor 509; powering down the electromagnetic chuck 26 under the control of the PLC logic controller 502; detaching the electromagnetic chuck 26 from the battery box; and retracting the electromagnetic pusher along the objective table 10 and fixing the electromagnetic pusher, to replace one battery box; repeating the above steps until all of the spent battery boxes are replaced; and then returning the battery replacement robot with the mobile storage rack to standby at an initial position.

Although the embodiments of the disclosure have been described in conjunction with drawings above, but it does not intend to limit the scope of the disclosure, and the person skilled in the art should understand that various modifications and variations which can be made by the person skilled in the art without any creative work fall into the scope of the disclosure.

The invention claimed is:

1. A battery replacement robot with a mobile storage rack, comprising a mechanical part and an electric control part, wherein:

the mechanical part comprises a horizontal mobile unit which is movable in X, Y and Z coordinate axis directions in a rectangular coordinate system, a bearing unit and a carrier unit; a middle portion of the carrier unit is hollow, and a battery box replacement device is installed in a middle of the hollow portion of the carrier unit; and a console is arranged on the horizontal mobile unit;

a battery box storage rack is provided on at least one side of the horizontal mobile unit, the electric control part controls the battery box replacement device to take all full-charged battery boxes at once; place the battery boxes on the battery box storage rack; move the battery boxes to a standby position of a battery replacement; remove a discharged battery box from a vehicle, place the discharged battery box on the battery box storage rack; take one full-charged battery box from the battery box storage rack; install the full-charged battery box in a corresponding position; and repeat the above steps to replace all battery boxes;

wherein the battery box replacement device comprises a horizontal rotary table, the horizontal rotary table is a round plate; and the horizontal rotary table is rotatable among a first working position, a second working position and a third working position;

wherein in the first working position, the electric control part controls the battery replacement robot to take the battery box from or to put the battery box to a rechargeable battery rack unit; in the second working position, the electric control part controls the battery replacement robot to take the battery box from or to put the battery box to the battery box storage rack; in the third working position, the electric control part controls the battery replacement robot to take the battery box from or to put the battery box to the vehicle.

2. The battery replacement robot with the mobile storage rack according to claim 1, wherein at least one set of wheels is provided on each of two sides of the horizontal mobile unit, and the wheels are installed at two sides of a lower beam to cooperate with ground rails, respectively; the ground rails are uniformly distributed in a plurality of rows, and a limit block is disposed at an end of the ground rail; the wheels are connected to a motor reducer, and the motor reducer is arranged on the lower beam and connected to a servo motor moving in a horizontal direction; and the servo motor moving in a horizontal direction is connected to the electric control part.

3. The battery replacement robot with the mobile storage rack according to claim 1, wherein the carrier unit comprises an objective table, a middle portion of the objective table is hollow, and the battery box replacement device is installed at the hollow middle portion of the objective table; and a support is provided at each of two sides of the objective table, a plurality of sets of longitudinal guide wheels are arranged inside the support, and a plurality of limit wheels are arranged outside the support and adapted to cooperate with the bearing unit.

4. The battery replacement robot with the mobile storage rack according to claim 1, wherein the round plate is connected to a servo driving motor for horizontal rotary via a gear reduction mechanism; a working surface is provided on the round plate, a battery box pushing mechanism is arranged on the working surface, a supporting beam is arranged on the battery box pushing mechanism, and the supporting beam is connected with a battery box tray; the battery box pushing mechanism comprises at least two guide rails provided in parallel, a battery box pushing mechanism driving motor, a battery box driving mechanism and an electromagnetic pusher, and the battery box driving mechanism is a pinion-and-rack mechanism; the battery box pushing mechanism driving motor and the electromagnetic pusher are connected to the respective pinion-and-rack mechanism, two round electromagnetic chucks are installed on a pusher working surface of the electromagnetic pusher and distributed at two ends of the working surface, and the two round electromagnetic chucks are located to corresponding positions of two round iron blocks of the battery box; an unlocking mechanism is provided on the pusher working surface of the electromagnetic pusher and adapted to cooperate with a locking device of a battery inner box; the guide rails are arranged on a top surface of the battery box pushing mechanism; the guide rails match with the battery box, and the battery box is a case, in which batteries are arranged in groups; at least one ultrasonic distance measuring sensor is provided at each of two ends of the supporting beam; and the servo driving motor for horizontal rotary, the battery box pushing mechanism driving motor, the electromagnetic chucks and the sensors are all connected to an electric part.

5. The battery replacement robot with the mobile storage rack according to claim 1, wherein the electric control part comprises a master computer system, a PLC logic controller, a limit switch, an emergency stop switch, a servo motor, a servo driver, a motor encoder, an ultrasonic sensor, a color mark sensor, a photoelectric sensor, a DMP position sensor, a wireless communication module I, and a wireless communication module II; the master computer system comprises an industrial personal computer and a touch screen; and the industrial personal computer is connected to the wireless communication module I through a serial port;

the PLC logic controller is electrically connected to the servo driver, the emergency stop switch, the ultrasonic sensor, the color mark sensor, the photoelectric sensor and the DMP position sensor; and communicates with the master computer system through the serial port, to perform a logic control on a movement of the robot.

* * * * *